United States Patent [19]

Körber et al.

[11] Patent Number: 4,834,421
[45] Date of Patent: May 30, 1989

[54] FASTENING MEANS FOR A GAS CUSHION UNIT IN A MOTOR CAR

[75] Inventors: Jürgen Körber; Klaus Arold, both of Sindelfingen; Alban Bossenmaier, Stuttgart, all of Fed. Rep. of Germany

[73] Assignee: Daimler-Benz Aktiengesellschaft, Stuttgart, Fed. Rep. of Germany

[21] Appl. No.: 174,223

[22] Filed: Mar. 28, 1988

[30] Foreign Application Priority Data

Mar. 28, 1987 [DE] Fed. Rep. of Germany ....... 3710417

[51] Int. Cl.$^4$ ............................................. B60R 21/22
[52] U.S. Cl. .................................... 280/732; 280/743
[58] Field of Search ............... 280/730, 732, 736, 740, 280/728

[56] References Cited

FOREIGN PATENT DOCUMENTS 3519724 7/1986 Fed. Rep. of Germany .

Primary Examiner—Charles A. Marmor
Assistant Examiner—Karin Tyson

[57] ABSTRACT

The application relates to a fastening means for a gas cushion unit associated with a passenger seat in a motor car, where the gas cushion unit exhibits a housing which is slidable into a frame formed by fixed parts of the vehicle and is anchorable there by the cooperation of a central screw which penetrates frame and housing at their upper side and lower side. In order to achieve absolutely reliable anchorage for a minimum assembly outlay, it is provided according to the invention that a channel closed radially at least in sections and serving for the passage of the central screw is provided on the rear side of the housing at least on a part of its vertical extension.

6 Claims, 2 Drawing Sheets

FASTENING MEANS FOR A GAS CUSHION UNIT IN A MOTOR CAR

BACKGROUND AND SUMMARY OF THE INVENTION

The invention relates to a fastening means for a gas cushion unit associated with a passenger seat in a motor car, where the gas cushion unit exhibits a housing which is slidable into a frame formed by fixed parts of the vehicle and is anchorable there by the cooperation of a central screw which penetrates frame and housing at their upper side and lower side.

A fastening means of this type may be seen to be already known from German Patent Application DE-PS 35 19 724. The known fastening means exhibits the disadvantage that the anchorage of the housing of the gas cushion unit to the fixed frame of the vehicle occurs via four catch cams in two bridge elements, which are not visible at the time of assembly. If the housing is inserted only slightly twisted, at least one catch cam fails to be introduced into its associated bore. Upon the activation of the gas cushion the possibility then exists that the forces acting cannot be reliably absorbed.

It is therefore an underlying object of the present invention to develop further a fastening means of the type in question, so that maximum possible reliability is achieved in spite of extreme simplicity of assembly.

This object is achieved according to the invention in that a channel closed radially at least in sections and serving for the passage of the central screw is provided on the rear side of the housing at least on a part of its vertical extension.

In an advantageous development of the invention, a particularly simple mode of assembly is achieved in that the channel is open on its rear side remote from the housing in the terminal region from which the central screw can be introduced in order to permit a sliding of the housing into the frame in the case of a preassembled central screw projecting over the associated edge of the frame.

Other objects, advantages and novel features of the present invention will become apparent from the following detailed description of the invention when considered in conjunction with the accompanying drawings.

DETAILED DESCRIPTION OF THE DRAWINGS

The gas cushion comprises a housing 1 constructed as a cast component, which is slidable into a frame 2 made of sheet metal and fixed to the vehicle in the region of an instrument panel 3 of a motor car.

Figure 1:
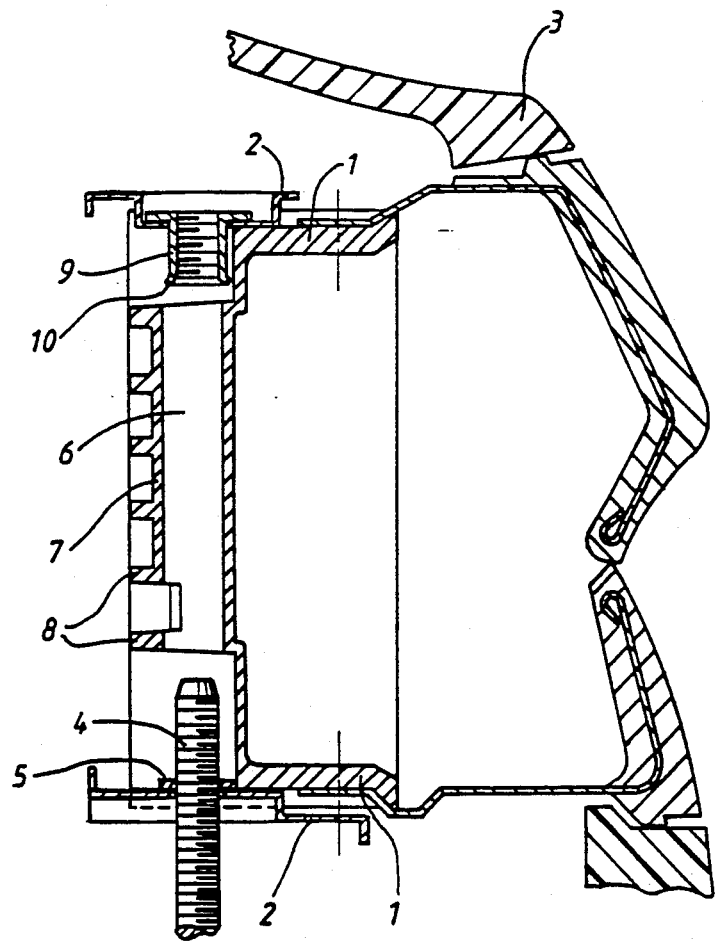
FIG. 1 shows a vertical section in the center of the housing of a gas cushion unit, which preassembled central screw, constructed in accordance with a preferred embodiment of the invention.
Figure 2:
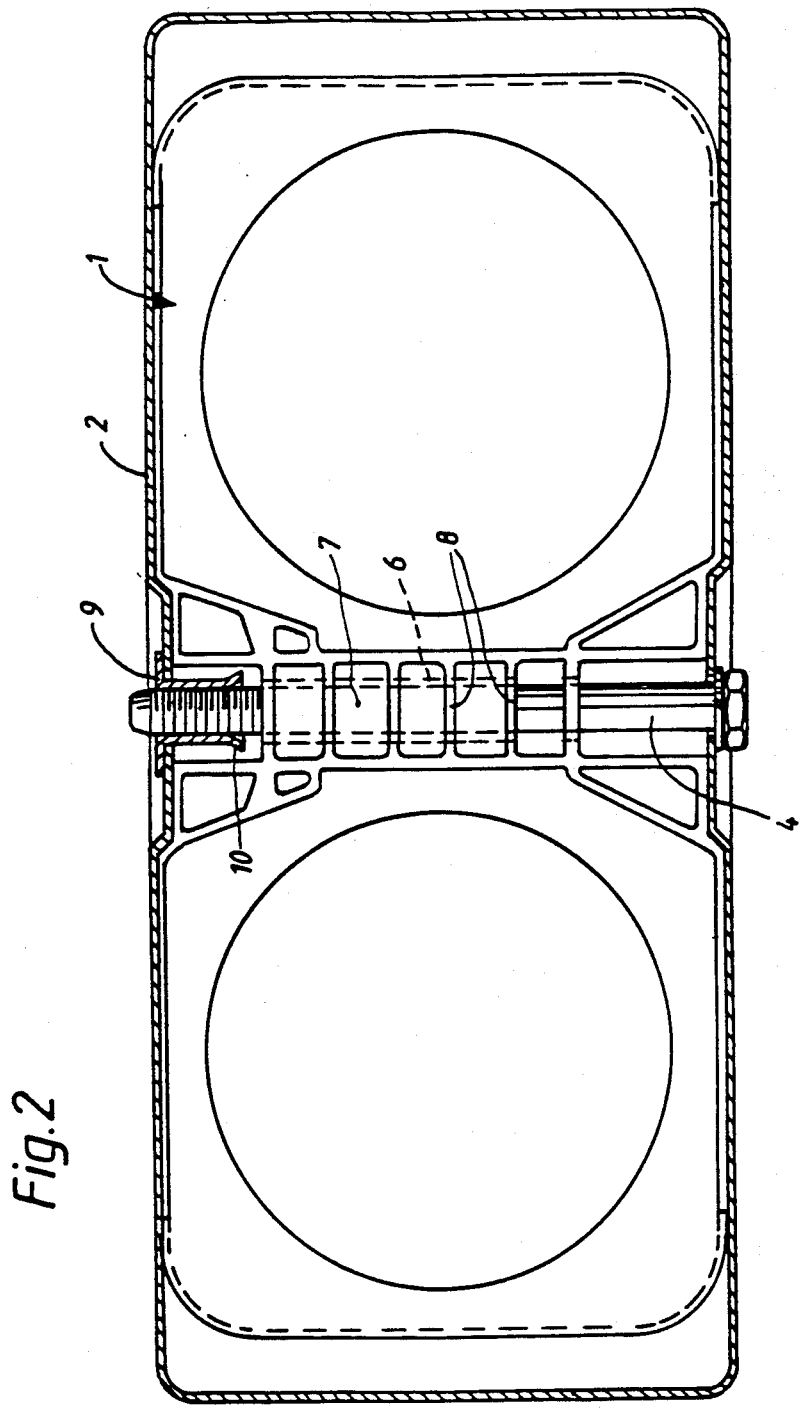
FIG. 2 shows a rear elevation of the installed housing of FIG. 1, with central screw tightened.

A central screw 4, which serves to anchor the housing 1 in the frame 2, is illustrated in FIG. 1 of the drawing in a preassembled position retained by a securing ring 5.

The housing 1 exhibits on its rear side a channel 6 serving for the passage and optionally—in the case of a central screw not quite fully tightened—the bracing of the housing against the latter, which is closed radially by a wall 7 and reinforced by stiffening fins 8 on a part of its height. The wall 7 could optionally also be omitted and the local stiffening fins 8 would then assume the function of the latter.

The rear radial delimitation of the channel 6 remote from the housing 1 is omitted in the bottom region to permit the housing 1 to be slid in in the case of a preassembled central screw 4.

However, in the exemplary embodiment illustrated it is also omitted in the top terminal region, where a welded nut 9 fastened to the frame 2 is provided, which exhibits an introduction funnel 10 on its side serving for the introduction of the central screw 4. Due to this formation of the channel, the fixed welded nut 9 also does not obstruct the introduction of the housing 1.

The free end of the central screw 4 is tapered for easier location of the introduction funnel 10.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Fastening means for a gas cushion unit associated with a passenger seat in a motor car, wherein the gas cushion unit includes a housing having front and rear sides which is slidable rear side first into a frame formed by fixed parts of the vehicle and is anchorable there by the cooperation of a central screw which penetrates frame and housing at their upper and lower side, wherein a channel closed radially and serving for the passage of the central screw is provided on the rear side of the housing at least on a part of its vertical extension, and wherein the frame has a complementary screwthread for the central screw opposite the screw entry side.

2. Fastening means according to claim 1, wherein the walls of the channel are provided with stiffening fins on their side remote from the housing interior.

3. Fastening means according to claim 1, wherein the channel is open on its side remote from the housing in the region from which the central screw can be introduced in order to permit an unobstructed sliding of the housing into the frame in the case of a preassembled central screw projecting over the associated edge of the frame and beyond the lower side of the housing.

4. Fastening means according to claim 3, wherein the frame comprises a welded nut having the complementary screwthread for the central screw and the channel is also open on its side remote from the housing in the region opposite the screw entry side for the passage of the welded nut.

5. Fastening means according to claim 4, wherein the welded nut exhibits an introduction funnel on its side serving for the introduction of the central screw and/or in that the free end of the central screw is tapered.

6. Fastening means according to claim 1 wherein the radially closed channel has at least one transverse opening on its side remote from the housing.

* * * * *